(No Model.)
N. P. OTIS & R. C. SCHMIDT.
VALVE OPERATING DEVICE.
No. 306,097. Patented Oct. 7, 1884.
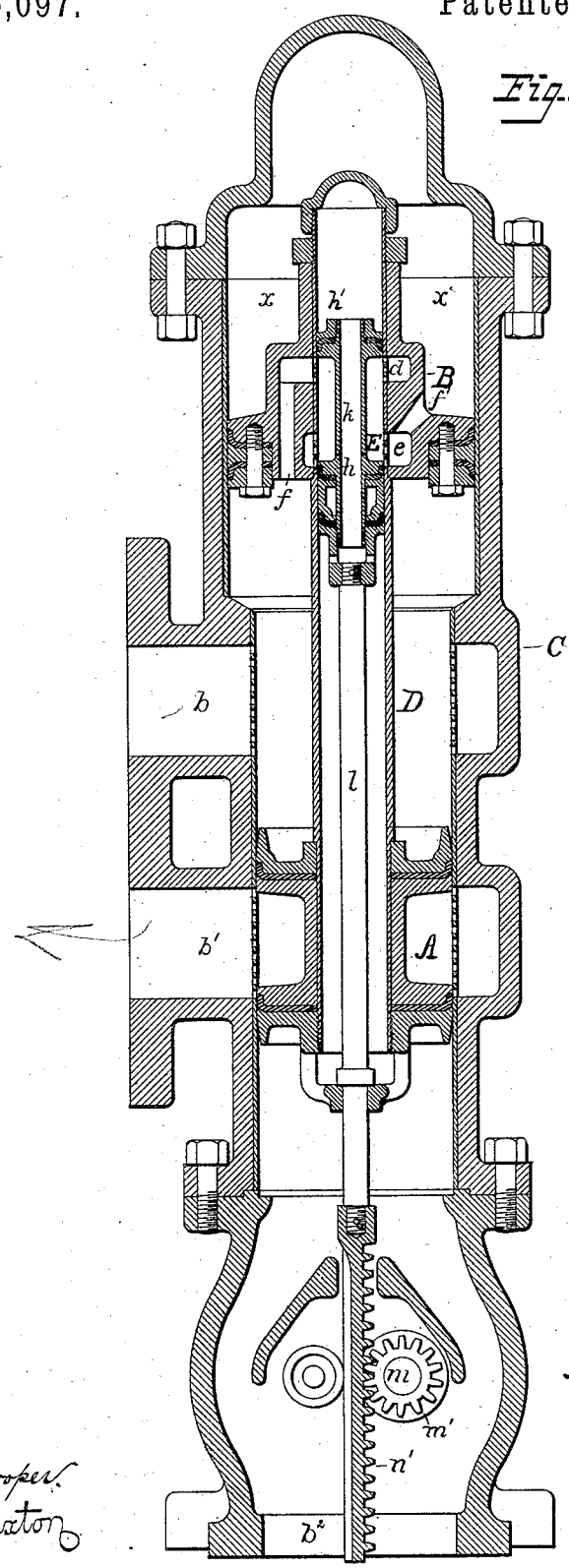

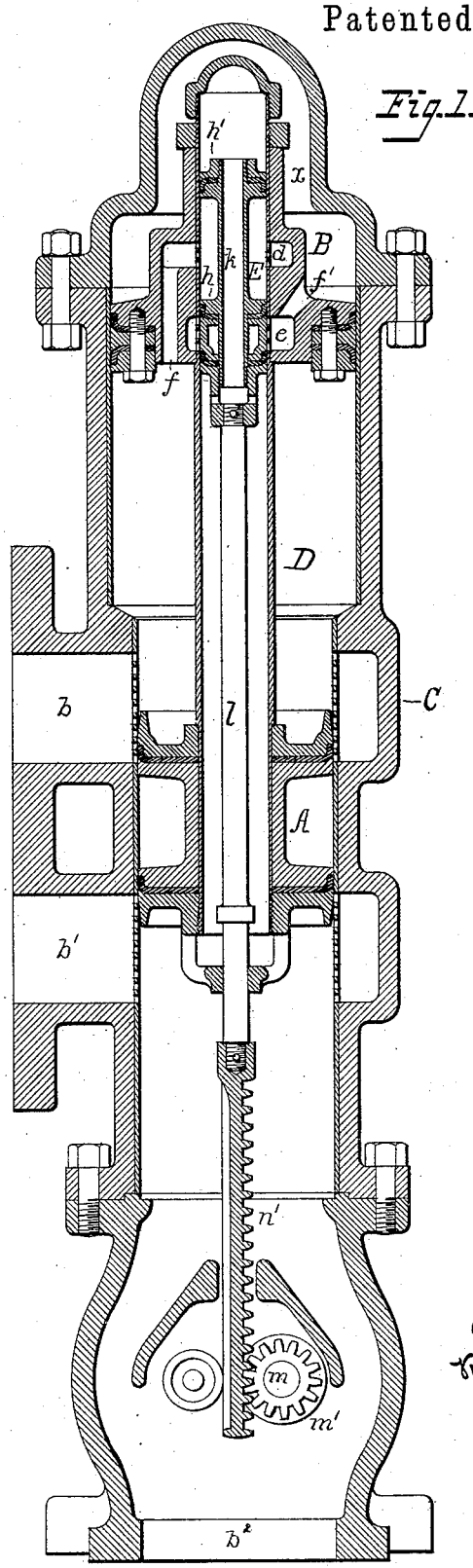

UNITED STATES PATENT OFFICE.

NORTON P. OTIS AND RUDOLPH C. SCHMIDT, OF YONKERS, NEW YORK.

VALVE-OPERATING DEVICE.

SPECIFICATION forming part of Letters Patent No. 306,097, dated October 7, 1884.

Application filed August 15, 1882. (No model.)

*To all whom it may concern:*

Be it known that we, NORTON P. OTIS and RUDOLPH C. SCHMIDT, both of Yonkers, in the county of Westchester and State of New York, have jointly invented certain Improvements in Valve-Operating Devices, of which the following is a specification.

This invention has for its object to operate valves and other devices easily and with precision, and this object we effect by the use of apparatus whereby the power of the motor-fluid, or other fluid under pressure, is made the means of shifting the valve, and whereby the latter is arrested automatically at any desired point.

In the drawings, Figure 1 is a sectional elevation of an elevator-valve illustrating our improvement, and Fig. 2 is a view showing the parts in a different position.

In many classes of machinery it is desirable to shift valves, rods, or other devices with ease and rapidity, to bring them nicely, exactly, but quickly to the required positions.

To effect these objects, we combine with a tube, D, a piston, B, and cylinder containing such piston, and ports and passages arranged so that the shifting of a small supplemental valve operated by a rod or spindle, $l$, or otherwise, will regulate the application of a motor-fluid to the piston, and thereby change the position of the main piston and its appurtenances.

We also so construct the parts that as the piston comes to its proper position the ports and passages will be closed, thereby cutting off the flow of the fluid by which it is actuated.

In the drawings these parts are shown in connection with a chest, C, closed at the top, adapted to communicate through ports $b\ b'$ with the circulating-pipes of an elevator-cylinder, and having at the bottom a discharge-port, $b^2$.

The valve A may be shifted to open, and also to cut off communication between the ports $b\ b'$, or to open the port $b'$ to the discharge $b^2$.

The valve-spindle D is hollow and secured at the upper end to the piston B, which (if the operating-fluid is not at a greater pressure than that governed by the valve A) is larger in diameter than the valve A, slides in the upper end of the chest C, and has two annular passages, $d\ e$, the former communicating through a port, $f$, with the space below or at one side of the piston, and the latter, through the port $f'$, with the space $x$ above the piston.

By admitting pressure to one or the other side of the piston B the valve A is shifted, and this is effected by the supplementary valve E, consisting of a cylinder, $h$, and disk $h'$ upon a hollow stem, $k$, open at both ends, and connected to the end of the valve-rod $l$.

The spindle D constitutes a cylindrical lining or bushing in which the valve E slides, and is perforated at points opposite the passages $d\ e$, and the cylinder $h$ is of such a width that when in the position shown in Fig. 1 it will close the openings leading to the passage $e$, the disk $h'$ always being above the passage $d$.

When the parts are in the position shown in Fig. 1, the ports $b'\ b^2$ are in communication, the motor-fluid (in this case water from the port $b$) is below the valve B and also confined in the space $x$ above it, so that it remains stationary. If, now, the rod $l$ is carried downward until the passages $d$ and $e$ are put in communication, as in Fig. 2, the water will flow through the port $f$, passages $d$ and $e$, and port $f'$ into the space $x$, and will act upon the upper face of the piston, (and, bearing at the same time upon the upper end of the valve A,) will carry the piston and valve downward. The downward motion of the parts will continue until the passage $e$ is opposite to and its openings closed by the cylinder $h$, when the flow of water to the space $x$ will be arrested, and no further movement of the valve A and appurtenances can take place, thus bringing the valve A to and stopping it at a point determined by the extent to which the valve E has been moved.

When the valve A is to be raised, the valve E is moved upward until the passage $e$ is in communication with the interior of the spindle D, when the water from the chamber $x$ will flow out, and the piston B will move upward under the pressure upon its lower face until the passage $e$ is again closed, the exact extent of the upward motion being thus precisely determined by the position to which the valve E is set.

It will be apparent that but little exertion is necessary to move the valve E, and that such movement is sufficient to insure the shifting of a main valve requiring for its direct operation a power much greater than any that could be applied to the valve E.

The valve E may be moved by different appliances. We have shown a pinion, $m'$, gearing with a rack, $n'$, on the valve-rod, and secured to a stem, $m$, extending to the outside of the casing, where it may be provided with a lever, crank, or pulley to receive an operating belt or rope.

We do not confine ourselves to the precise construction of the valve E and arrangement of ports and passages, as this will vary with the construction of the apparatus, and it will be evident that chest C and its appliances may be vertical or horizontal.

It will further be apparent that the fluid may be conducted to opposite sides of the piston through ports and passages made in the valve E, instead of in the piston, it only being necessary that they be so arranged as to permit the motor-fluid to pass to one side or the other of the piston after the valve is shifted, and to be closed as the piston reaches its position.

The piston B may be connected to any part of an apparatus which it is desired to shift from time to time.

Without, therefore, confining ourselves to the precise construction and arrangement shown, we claim—

1. The combination of a casing to which a motor-fluid is admitted, a piston sliding within the same, and an adjustable valve with ports and passages, whereby the fluid may be brought to act upon one or other side of the piston to move the same, and appliances whereby said valve may be set by hand to any desired position, the valve, piston, and valve-ports being relatively constructed and arranged to insure the closing of the ports and arrest of the piston when it reaches the point at which the valve is set.

2. The combination of a cylinder having ports, valves A and E, and a piston, B, provided with ports and passages arranged to be opened on the shifting of the valve E to admit the fluid to one side or the other of the piston, and to be closed as the piston reaches its position, determined by that of the valve E, substantially as specified.

3. The combination, with a cylinder or chest, C, of the main valve A, piston of greater area, both connected with a tube within the chest, and a supplemental valve, E, arranged within said tube, and ports and passages arranged substantially as set forth, whereby the motor-fluid is brought to bear on the opposite faces of the piston, according to the direction in which the supplemental valve is shifted, substantially as set forth.

4. The combination of the casing, closed at one end and open at the other, main valve A, tubular stem D, containing a supplemental valve, E, and a rod, $l$, piston B, fixed to the stem, said valve E and piston B having passages and ports $d\ e\ f\ f'$, substantially as set forth.

In testimony whereof we have signed our names to this specification in the presence of two subscribing witnesses.

NORTON P. OTIS.
  RUDOLPH C. SCHMIDT.

Witnesses:
 G. H. ALEXANDER,
 CHARLES E. FOSTER.